United States Patent [19]
Renzo

[11] 3,809,894
[45] May 7, 1974

[54] OPTICAL SCANNER
[75] Inventor: Peter C. Renzo, Saddle River, N.J.
[73] Assignee: Creative Logic Corporation, Paramus, N.J.
[22] Filed: Jan. 30, 1973
[21] Appl. No.: 327,926

Related U.S. Application Data
[63] Continuation of Ser. No. 73,380, Sept. 18, 1970, abandoned.

[52] U.S. Cl............... 250/236, 250/219 D, 350/6
[51] Int. Cl.............................................. G08c 9/06
[58] Field of Search...... 250/219 DD, 219 DA, 236, 250/219 D, 217; 356/160; 350/6

[56] References Cited
UNITED STATES PATENTS

| | | | |
|---|---|---|---|
| 2,769,374 | 11/1956 | Sick | 250/221 |
| 2,918,584 | 12/1959 | Edsberg et al. | 250/211 X |
| 3,091,699 | 5/1963 | Hammar | 250/236 X |
| 3,277,772 | 10/1966 | Atwood | 250/236 X |
| 3,369,126 | 2/1968 | Adams | 250/236 X |
| 3,508,065 | 4/1970 | Holford | 250/236 X |
| 3,566,080 | 2/1971 | Uffelman et al. | 250/219 QA |
| 3,634,696 | 1/1972 | Wildhaber | 250/219 D |
| 3,591,249 | 7/1971 | Wildhaber | 250/236 X |

Primary Examiner—Walter Stolwein
Attorney, Agent, or Firm—Howard C. Miskin

[57] ABSTRACT

This optical scanner contains a rotor having a plurality of lenses arranged in a helix coaxial with the rotor and having a single convolution. A light source is positioned to emit light appearing to come from the rotor axis. Each lens in turn projects an image of said light source to a record, lighting a narrow area thereof. This lighted area scans a character line of the record as the rotor turns. The axially displaced lenses successively scan different lines of characters without any motion additional to said rotation. The lighted area is projected towards the rotor axis to a region common to all area positions, and a photocell receives the light projected to said region.

9 Claims, 4 Drawing Figures

PATENTED MAY 7 1974  3,809,894

INVENTOR:
PETER C. RENZO

BY
Howard C. Miskin
ATTORNEY

OPTICAL SCANNER

This is a continuation of application Ser. No. 73,380 filed 9/18/70, now abandoned.

The present invention relates to optical scanners for characters arranged in lines on a record, to convert them into electric impulses for transmission to a computer, or to tape, or to a distant station.

One of its objects is to provide a scanner of simple construction capable of scanning a plurality of lines on a stationary record.

Another aim is to provide a scanner capable of scanning a plurality of lines of characters merely by rotation of a part, without any further motions.

A further object is to provide a scanner of this type that uses a single photocell, or very few photocells.

The invention will be described with the drawing, in which

Figure 3:
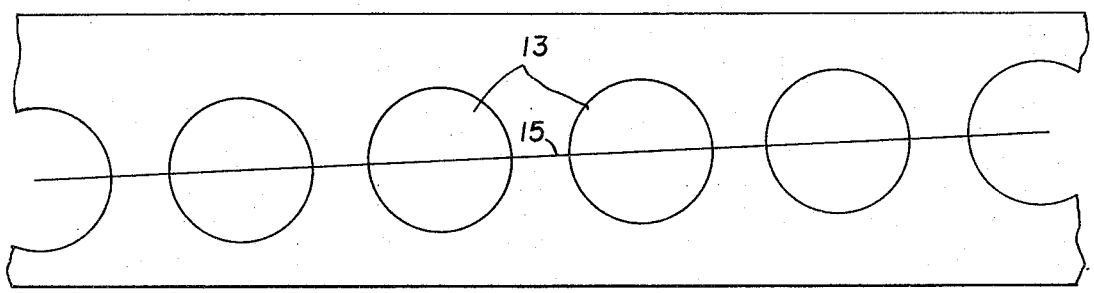

FIG. 3. is a development to a plane of a cylindrical surface coaxial with the scanner rotor and containing the lens centers, showing the lens positions.

Figure 1:
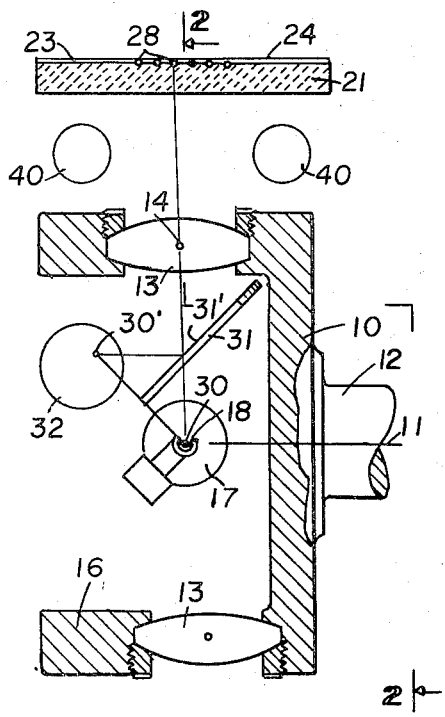
FIG. 1 is an axial section laid through the scanner rotor, showing also associated parts.
Figure 4:
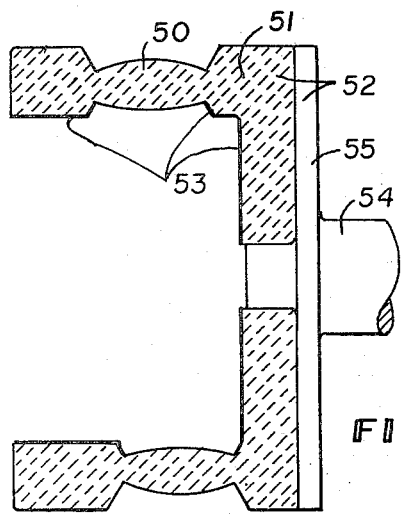

FIG. 4 is an axial section similar to FIG. 1 but showing a modification of the rotor.

The records used in this scanner preferably contain characters or symbols made up of straight lines parallel to the narrow area lighted at each instant.

Figure 2:
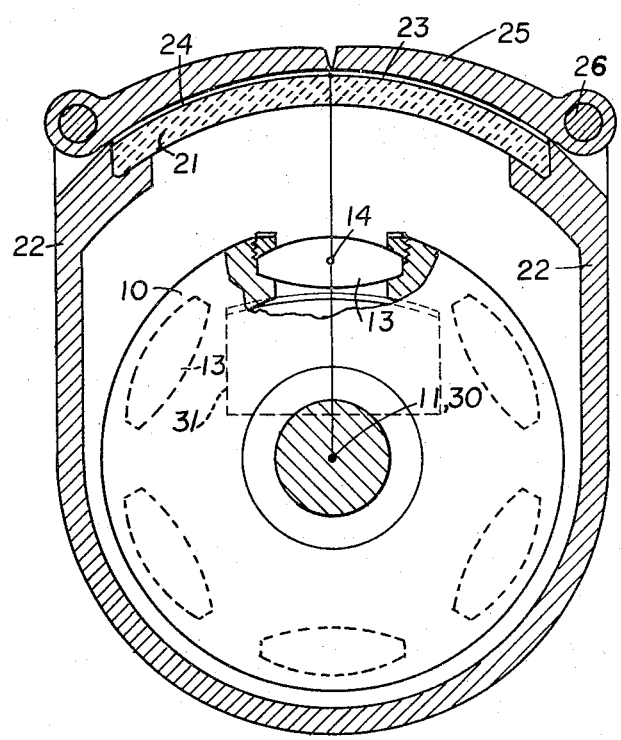
FIG. 2 is a view taken along the rotor axis and a section taken along lines 2—2 of FIG. 1, looking in the direction of the arrows.

In FIGS. 1 to 3, the rotor 10 with axis 11 and shaft 12 contains a plurality of lenses 13 spaced about its axis 11 at equal distances therefrom, but which are displaced in the direction of said axis from one another. The lens centers lie on a crylindrical surface coaxial with the rotor. The axial displacement between adjacent lenses is constant, so that the lens centers occupy a helix of constant lead. This helix appears as a straight line 15 in the development shown in FIG. 3. The lenses 13 may be inserted in known manner to the rotor body 16.

A source of light 17, or source of radiant energy, is placed on axis 11, as for instance an incandescent lamp with a filament in line with axis 11. More broadly, a source of radiant energy is placed so that a narrow ribbon or line of light 18, or a spot of light, appears to come from axis 11, or at least from inside said cylindrical surface that contains the lens centers. It could be accomplished also with a mirror, without placing said source on the rotor axis, as shown in the patent application of Ernest Wildhaber, entitled "Optical Scanning Apparatus," filed Mar. 9, 1970, Ser. No. 17,792 now U.S. Pat. No. 3,634,696, issued Jan. 11, 1972. Reference is made thereto.

A refractory member 21 secured to the frame 22 contains a cylindrical outside surface 23 that is coaxial with the rotor 10. Its radius and the lenses 13 are so related in known manner, that the image formed of the ribbon of light 18 by any of the lenses 13 lies on the cylindrical surface 23. A record 24 is pressed against the cylindrical surface 23, as for instance by lined covers 25 hinged at 26 to the frame 22 of the scanner, pressure being exerted through the weight of the covers.

The record may contain as many or fewer lines to be scanned as there are lenses 13 in the rotor 10. The record is positioned so that its middle lines of symbols correspond to the lenses 13 of middle axial position. The light images formed by the different lenses 13 have axially spaced positions 28 (FIG. 1), the positions of the lines of symbols. Light center 30, any lens center 14 and the corresponding image center 28 lie in a straight line.

Light reflected from the narrow lighted area that sweeps over the symbols as the rotor turns, returns through the same lens 13 that projected said lighted area. A plane image-splitter 31 is set in the path of light between the row of lenses and the rotor axis 11. The image-splitter is a lightly coated plane mirror. If it were not for the image-splitter the reflected light would again form an image of the lighted area around center 30. The splitter forms an image also adjacent point 30' on the opposite side of the reflecting surface 31' and at an equal distance therefrom.

A photocell 32 is placed in the vicinity of point 30'. It receives the variations of light and darkness and transforms them into electric impulses.

The lines of characters should be exactly aligned with the scanning lines of the lenses and lie in planes perpendicular to the rotor axis.

Instead of relying on parallelism of the lines with the top side of the record sheet, on specific distances of the lines therefrom and on exact insertion of the record onto its seat, I may mark the scanning lines as thin lines on the cylindrical seat surface and align the record directly to these lines. The lines are made visible through the record sheet by illumination during insertion from inside the cylindrical surface 23. Lights 40, FIG. 1, could be used to this end.

If desired, the rotor may be dynamically balanced for high-speed operation.

In the rotor illustrated in FIG. 4, the lenses 50 are formed integral with the main body 51 of the rotor 52. Body 51 may be made of refractory material, for instance Lucite. It is coated on the inside, at 53, to render it opaque except for the lenses. It is secured to a shaft 54 with flange 55.

Various modifications may be made in my invention without departing from its spirit. For definition of its scope it is relied on the appended claims.

What I claim is:

1. Optical scanner for scanning characters arranged in lines on a record, comprising
    a rotor containing a plurality of lenses spaced about its axis at an equal distance therefrom, with the lens centers lying in a single continuous helical convolution on a cylindrical surface coaxial with said rotor,
    said lenses having different positions lengthwise of the rotor axis,
    a source of light disposed inside of said cylindrical surface and having a narrow linear light emitting illumination area,
    a seat for receiving a record at a distance from the rotor axis suitable for said lenses to form an image of said light source on the record to concentrate said light to a narrow linear area thereof, the displacement or said lenses lengthwise of the rotor axis being such that the lighted area formed by said axially displaced lenses sweeps successively a different line of the record on rotation of said rotor, with no feed motion between the record and the rotor being required, means for projecting said lighted area in a general direction toward the rotor axis to a region common to all positions of said moving lighted area, and a photocell placed to receive the light coming to said region.

2. Optical scanner according to claim 1, wherein said source of light is set to emit light appearing to come from the rotor axis.

3. Optical scanner according to claim 1, wherein said lenses are arranged on a helix of constant lead.

4. Optical scanner according to claim 1, wherein said means for projecting the lighted area towards the rotor axis comprises the same lens that forms said lighted area.

5. Optical scanner according to claim 1, wherein said means for projecting the lighted area towards the rotor axis comprises the same lens that forms said lighted area, and a stationary plane mirror inclined to the rotor axis and set between the rotor axis and the region of the lenses of said rotor.

6. Optical scanner according to claim 1, wherein said means for projecting the lighted area towards the rotor axis comprises the same lens that forms said lighted area, and a stationary plane image splitter set between the rotor axis and the region of said lenses.

7. Optical scanner according to claim 2, wherein said seat for the record contains a cylindrical surface coaxial with the rotor, said surface being formed on the outside of a refractory part.

8. Optical scanner according to claim 1, wherein said rotor comprises a body portion and lenses inserted therein.

9. Optical scanner according to claim 2, wherein said body portion and said lenses are formed integral with each other of a refractory material, said rotor being coated to confine transparency to said lenses.

* * * * *